United States Patent [19]

Reverberi

[11] 4,386,782
[45] Jun. 7, 1983

[54] GUIDE AND SEAL ASSEMBLY FOR A PISTON OF A DROWNED PISTON TYPE PUMP

[75] Inventor: Corrado Reverberi, Modena, Italy

[73] Assignee: Annovi Reverebi S.p.A., Italy

[21] Appl. No.: 284,549

[22] Filed: Jul. 20, 1981

[30] Foreign Application Priority Data

Jul. 24, 1980 [IT] Italy ............................. 53423/80[U]

[51] Int. Cl.³ .................. F16J 15/18; F04B 39/00
[52] U.S. Cl. .................. 277/59; 277/72 R; 277/73; 92/168
[58] Field of Search ............ 277/29, 59, 70, 71, 277/72 R, 73, 74, 75, 79; 92/166, 168

[56] References Cited
U.S. PATENT DOCUMENTS

| | | | |
|---|---|---|---|
| 2,386,898 | 10/1945 | Karassik | 277/59 X |
| 3,100,648 | 8/1963 | Lee et al. | 277/59 |
| 3,559,540 | 2/1971 | Sheldon | 92/168 X |
| 4,055,107 | 10/1977 | Bartley | 277/59 X |

FOREIGN PATENT DOCUMENTS

| | | | |
|---|---|---|---|
| 693818 | 9/1964 | Canada | 92/168 |
| 2257665 | 8/1973 | Fed. Rep. of Germany | 92/168 |
| 2320458 | 3/1977 | France | 277/59 |
| 408416 | 12/1944 | Italy | 277/71 |

*Primary Examiner*—Robert S. Ward, Jr.
*Attorney, Agent, or Firm*—Kane, Dalsimer, Kane, Sullivan and Kurucz

[57] ABSTRACT

A guide and seal assembly for a piston of a drowned piston type pump comprising at least a chamber within which the said piston reciprocates to suck into and supply from the said chamber a liquid. The assembly comprises a ring having a first frontal seat for a first annular seal element having a substantially C-shaped cross-section and an annular groove formed in the inner cylindrical surface of the ring and arranged to accommodate a second annular seal element of substantially U-shaped cross-section; a first and a second annular cavities formed in the ring communicate with each other by means of at least a radial hole, and the first annular cavity communicates with at least a discharge hole for the liquid which gathers in the first cavity.

3 Claims, 1 Drawing Figure

U.S. Patent   Jun. 7, 1983   4,386,782
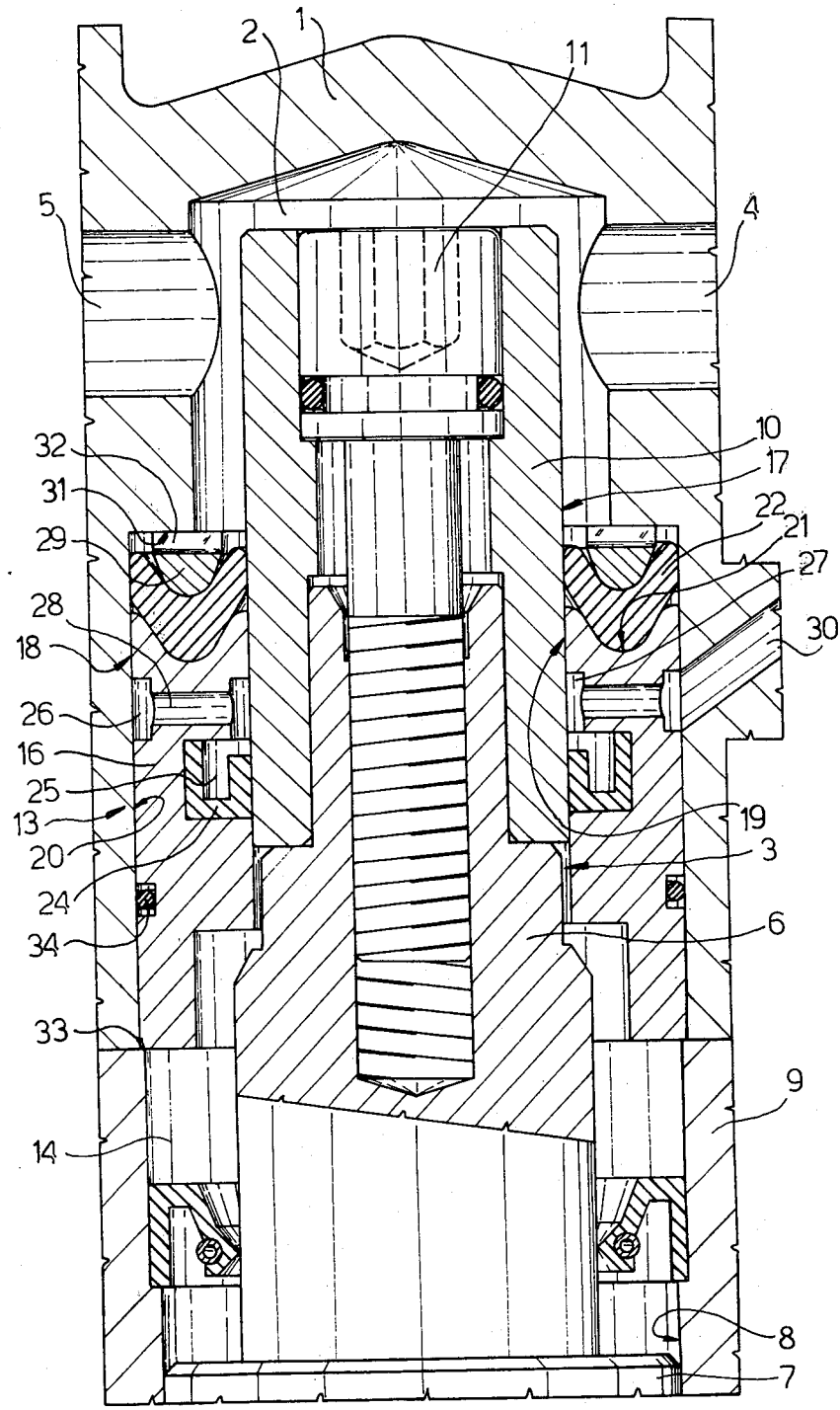

GUIDE AND SEAL ASSEMBLY FOR A PISTON OF A DROWNED PISTON TYPE PUMP

BACKGROUND OF THE INVENTION

The present invention relates to a guide and seal assembly for a piston of a drowned piston type pump.

As is well-known, the pumps of the type specified hereinabove comprise at least a chamber in which a piston is reciprocated in order to suck into and supply from the said chamber a liquid; to obtain both the axial guide of the piston and the seal between the said chamber and the outside, assemblies are utilized which comprise one or more guide rings and sealing elements which are disposed in series in a suitable seat of the head of the pump and are apt to attain the two purposes mentioned hereinabove.

In the known seal assemblies a first annular seal member normally restrs on a corresponding seat of a first ring, which is kept in contact with a second seal member which is supported, in its turn, by a second ring. The said first ring is shaped and dimensioned in such a manner as to give origin, together with the surfaces of the piston and of the seat in which the assembly is housed, to two coaxial annular cavities which communicate with one another by means of one or more holes formed in the ring itself. Leading into the peripherically outmost cavity is a hole which connects the said cavity to a zone upstream of the suction valve of the pump, so as to suck from the said cavity the liquid which gathers in the cavity by passing through the first seal member and to convey it into the chamber in which the piston of the pump reciprocates.

According to a further technical solution of the problem, the said two rings are provided with parts which project both axially and radially, in order to also permit the first ring to directly rest on the second ring.

The seal assemblies constructed according to the two constructional solutions described hereinabove have some disadvantages. Both assemblies, but in particular the second assembly, are structurally rather complicated due to the shape of the first ring of the assembly; in fact, this ring, since it must give origin both to the two annular cavities which communicate with one another, and (in the case of the second technical solution) to the projecting parts mentioned hereinabove, is delimited by many surfaces having different diameters, and therefore its construction requires very precise mechanical operations and small working tolerances.

Furthermore, the assembly based on the first mentioned technical solution is not very satisfactory from the functional point of view, owing to the high force which the first ring discharges onto the second seal element, which force is generated by the considerable pressures which act onto the first element and are transmitted from this latter to the second element through the said forst ring.

Finally, in the assembly constructed in accordance with the second constructional solution some other difficulties arise in the construction of the seat of the assembly, since this seat is delimited by at least two cylindrical surfaces having different diameters.

SUMMARY OF THE INVENTION

The object of the present invention is to provide a guide and seal assembly of the type specified hereinabove, which assembly will be free from the mentioned disadvantages and therefore, in addition to exerting very efficient guide and seal actions will be structurally very simple and will not require very precise mechanical operations and small tolerances.

According to the present invention there is provided a guide and seal assembly for a piston of a drowned piston type pump comprising at least a chamber within which the said piston reciprocates to suck into and supply from it a liquid, the said seal assembly being arranged to guide the said piston and create a seal between the said chamber and the outside, characterized in comprising a ring delimited by a single inner-cylindrical surface having a diameter substantially equal to the diameter of a seat in which the assembly is housed, the said ring having a first frontal seat for a first annular seal element having a substantially C-shaped cross-section with inner and outer diameters substantially equal to the corresponding diameters of the said ring, and an annular groove formed in the said inner cylindrical surface of the said ring and arranged to accomodate a second annular seal element of substantially U-shaped cross-section, having an inner diameter substantially equal to the said inner diameter of the said ring and an outer diameter smaller than the outer diameter of the ring itself, a first annular cavity formed in the said outer surface of the said ring and between the said seal elements, and a second annular cavity formed in the said inner surface of the said ring and between the said seal elements, the said annular cavities being in communication with each other by means of at least a radial hole formed in the ring, and the said first annular cavity being in communication with at least a discharge hole for the liquid which accumulates in the said first cavity.

BRIEF DESCRIPTION OF THE DRAWING

For a better understanding of the present invention an embodiment thereof will now be described in detail by way of a non limiting example with reference to the accompanying drawing showing in section a head portion of a pump of the type with drowned pistons in a seat of which there is housed the guide and seal assembly of the present invention.

DETAILED DESCRIPTION OF THE INVENTION

A pump of the type specified hereinabove comprises a head, a portion of which is indicated by reference numeral 1 in the annexed drawing, having formed therein a plurality of chambers 2, in each of which there is reciprocable a piston, indicated generally by reference numeral 3 and of which only the upper portion is shown in the drawing.

Each chamber 2 communicates, through conduits 4 and 5 formed in the head itself, with a suction and a delivery valve (not shown) respectively, according to an arrangement known in the pumps of the type specified hereinabove.

Piston 3, which may have any structure whatever, in the case of the present embodiment comprises a body 6 provided with a slide 7 mobile longitudinally in a corresponding seat 8 of the pump casing 9 under the action of a connecting rod and crank mechanism (not shown). Keyed onto the cylindrical upper portion of the body 6 is a bushing 10 which is locked to the body by means of a screw 11 and whose function is to serve as a true piston and therefore enter at least partially the chamber 2 when the piston is in its upward stroke end position, as shown in the drawing.

The assembly according to the present invention, indicated generally by reference numeral 13, has the function of both acting as a guide for the bushing 10 and providing a seal for the liquid under pressure contained in the chamber 2, thus preventing the liquid to pass from the chamber into the cavity 14 of the casing of the pump.

The assembly according to the present invention substantially comprises a ring 16 made of a suitable metal material apt to give origin to a sliding seat for the cylindrical outer surface of the bushing 10, i.e. for example bronze. The said ring is delimited both externally and internally by a single cylindrical surface 18 and 19, respectively; this ring is housed in a corresponding cylindrical seat 20 formed in the head 1 of the pump.

The said ring has an annular front seat 21 having a substantially C-shaped cross-section, arranged to allow upporting an annular seal element 22 of the type provided with a pair of radially deformable lips whose diameters substantially coincide with those of the surfaces 18 and 19 of the ring itself.

A second seal element, of the type having a substantially U-shaped cross-section, indicated by reference numeral 24, is housed in an annular cavity 25 formed in the ring 16 in its radially inner portion, so that the innermost lip of the said element will rest on the surface 17 of the bushing 10. The said element is made of a material which is sufficiently deformable to allow introducing the element itself into the respective cavity.

Formed on the surfaces 18 and 19 of the ring 16, and between the two seal elements 22 and 24, are two annular cavities indicated by reference numerals 26 and 27 respectively, which communicate with one another by means of at least a hole 30 which communicates, through suitable conduits, with a zone upstream of the suction valve of the pump.

Conveniently, resting on the seal element 22 is a spacer 29 interposed between the element itself and the bottom surface 31 of the seat 20 of the assembly; this spacer is provided with radial notches 32.

The ring 16 rests, at its lower portion, on a counter-surface 33 of the casing 9, and conveniently, between the ring 16 and the seat 20 there is disposed a seal element 34 of circular cross-section, which is housed in a corresponding annular slot formed in the ring.

The operation of the guide and seal assembly according to the present invention is as follows.

During the reciprocation of the piston 3, this latter is rigorously guided by the cylindrical guide formed by the coupling between the outer surface 17 of the bushing 10 and the surface 19 of the ring 16.

During the stages of compression of the liquid inside the cavity 2, which compression stages are generated by the said reciprocating movement, pressures, even very high pressures (in the order of hundreds of atmospheres), are generated, so that the liquid tends to percolate into the annular space comprised between the outer surface 17 of the bushing 10 and the corresponding surfaces with which this latter is coupled.

The first annular seal element 22 provides a first seal, thus considerably reducing the said percolation; in fact, the pressure of the liquid acting onto the surface of the said annular element, which is turned towards the chamber 2, tends to push the lips of the said element against the surfaces 17 of the bushing 10 and of the cylindrical seat 20. The liquid which this first seal is non able to retain passes into the space comprised between the coupled surfaces 17 of the bushing 9 and the surfaces 19 of the ring 16 and gathers in the annular cavity 27 in which it is, obviously, under a pressure considerably lower than the pressure of the liquid existing in the chamber 2. The second seal element 24 is thus able to provide a seal for this liquid, thereby preventing a further percolation towards the cavity 14 inside the pump; this effect is obtained by the action of the radially innermost lip of the said seal element, which is applied with a pre-established pressure against the surface 17 of the bushing 10.

The liquid which gathers in the annular cavity 27 passes, through the hole 28, into the cavity 26 from which it is immediately sucked through the hole 30 in order to be again transferred into the chamber 2 of the pump.

Thus, it is clear that the guide and seal assembly described in the foregoing provides very efficient actions both of guide for the upper end of the piston 3, and of seal for the liquid of the chamber 2, and at the same time is constructionally very simple and comprises a single ring (16) which may be produced with considerable precision and at very low production costs.

In fact, the guide action is good owing to the considerable length of the guide provided by the surface 19 of the ring 16; the seal action is very good too, both because of the presence of two seal elements disposed in series and arranged to resist against pressures of very different values, and because the second element (24) may be mounted with a pre-established radial shrinking which is completely independent from the force produced by the pressures of the liquid which acts onto the other seal element 22.

It is clear that modifications and variations may be made to the described embodiment of the guide and seal assembly, without departing from the scope of the present invention.

I claim:

1. A guide and seal assembly for a piston of a drowned piston type pump comprising at least a chamber within which the said piston reciprocates to suck into and supply from the said chamber a liquid, the said seal assembly being arranged to guide the said piston and create a seal between the said chamber and the outside, characterized in comprising a ring delimited by a single inner cylindrical surface having a diameter substantially equal to the diameter of a seat in which the assembly is housed, the said ring having a first frontal seat for a first annular seal element having a substantially C-shaped cross-section with inner and outer diameters substantially equal to the corresponding diameters of the said ring, and an annular groove formed in the said inner cylindrical surface of the said ring and arranged to accomodate a second annular seal element of substantially U-shaped cross-section, having an inner diameter substantially equal to the said inner diameter of the said ring and an outer diameter smaller than the outer diameter of the ring itself, a first annular cavity formed in the said outer surface of the said ring and between the said seal elements, and a second annular cavity formed in the said inner surface of the said ring and between the said seal elements, the said annular cavities communicating with each other by means of at least a radial hole formed in the ring, and the said first annular cavity communication with at least a discharge hole for the liquid which gathers in the said first cavity.

2. An assembly as claimed in claim 1, characterized in that the said annular cavities are disposed substantially in the same plane orthogonal to the axis of the said ring.

3. An assembly as claimed in claim 1, characterized in that resting on the said first annular seal element is a spacer interposed between the element itself and a countersurface.

* * * * *